(12) United States Patent
Petersson et al.

(10) Patent No.: US 7,574,282 B2
(45) Date of Patent: Aug. 11, 2009

(54) ELECTRONIC DIRECTING SYSTEM

(75) Inventors: Ulf Petersson, Tollered (SE);
Bengt-Allan Bergvall, Jönköping (SE)

(73) Assignee: Husqvarna AB, Huskvarna (SE)

( * ) Notice: Subject to any disclaimer, the term of this patent is extended or adjusted under 35 U.S.C. 154(b) by 767 days.

(21) Appl. No.: 10/516,793

(22) PCT Filed: Jun. 3, 2003

(86) PCT No.: PCT/SE03/00917

§ 371 (c)(1),
(2), (4) Date: Jul. 11, 2005

(87) PCT Pub. No.: WO03/104909

PCT Pub. Date: Dec. 18, 2003

(65) Prior Publication Data

US 2005/0267629 A1    Dec. 1, 2005

(30) Foreign Application Priority Data

Jun. 7, 2002    (SE) .................................. 0201740

(51) Int. Cl.
*G06F 19/00* (2006.01)
(52) U.S. Cl. .................. 700/245; 700/248; 700/255; 700/258; 700/259; 701/23; 701/24; 701/25; 701/28; 701/200; 180/6.5; 180/167; 180/168; 180/169; 318/568.12; 318/587; 901/1; 901/9; 901/23; 901/42; 901/47; 342/357.06; 342/357.1; 342/357.13; 342/358

(58) Field of Classification Search .................. 700/245, 700/253, 254, 255, 258, 262, 302, 248; 318/568.12; 318/580, 581, 587; 180/167, 168, 169; 701/50, 701/213, 23, 24, 25, 28, 200, 207, 208, 212, 701/214, 301; 901/1, 9, 23, 42, 47; 342/357.06, 342/357.1, 357.13, 358; 348/36, 38, 39, 348/113; 219/124.34; 382/107, 278, 279; 606/130

See application file for complete search history.

(56) References Cited

U.S. PATENT DOCUMENTS

| | | | | |
|---|---|---|---|---|
| 4,789,940 A | * | 12/1988 | Christian | 700/113 |
| 4,829,442 A | * | 5/1989 | Kadonoff et al. | 701/207 |
| 4,887,223 A | * | 12/1989 | Christian | 382/153 |
| 4,933,864 A | * | 6/1990 | Evans et al. | 701/207 |
| 5,276,618 A | * | 1/1994 | Everett, Jr. | 701/25 |
| 5,974,348 A | | 10/1999 | Rocks | |
| 5,995,884 A | * | 11/1999 | Allen et al. | 701/24 |
| 6,459,955 B1 | * | 10/2002 | Bartsch et al. | 700/245 |
| 6,836,701 B2 | * | 12/2004 | McKee | 700/245 |
| 7,155,308 B2 | * | 12/2006 | Jones | 700/245 |
| 7,248,951 B2 | * | 7/2007 | Hulden | 701/23 |
| 7,388,343 B2 | * | 6/2008 | Jones et al. | 318/587 |
| 7,429,843 B2 | * | 9/2008 | Jones et al. | 318/568.12 |

FOREIGN PATENT DOCUMENTS

| | | |
|---|---|---|
| WO | 99/15941 | 4/1999 |
| WO | 99/38056 | 7/1999 |
| WO | 99/59042 | 11/1999 |

OTHER PUBLICATIONS

Database WPI, Week 198209, Derwent Publications Ltd., London, GB; Class Q 24, AN 1980-E8385C & US 4,316,253 a (Thomson CSF), Feb. 16, 1982.

* cited by examiner

*Primary Examiner*—Khoi Tran
*Assistant Examiner*—McDieunel Marc
(74) *Attorney, Agent, or Firm*—Pearne & Gordon LLP (57) ABSTRACT

The present disclosure relates to an arrangement and an electronic navigational control system for a self-propelling device (5), preferably a lawn-mowing robot. The system comprises at lease one navigational control system (3) connected to at least one signal generator (1) and a sensing unit arranged at the self-propelling device (5). The sensing unit senses at least one, in the air medium propagating, time and space varying magnetic field, at least transmitted via the navigational control station (3) and in turn retransmits at least one signal processed by the unit to at least one driving source which contributes to the device's movements across the surface. The system comprises structure by which the signal generator (1) sends a current through the navigational control station (3), the current generating the time and space varying magnetic field, whereby the sensing unit comprises structure by which the device (5) is maneuvered based on the properties of the sensed magnetic field.

36 Claims, 8 Drawing Sheets

ELECTRONIC DIRECTING SYSTEM

This application claims the benefit of International Application Number PCT/SE03/00917, which was published in English on Dec. 18, 2003.

TECHNICAL FIELD

The present invention relates to a procedure and an electronic navigational control system for a self-propelling device, preferably a lawn-mowing robot. The system comprises at least one navigational control station connected to at least one signal generator and a sensing unit arranged at the self-propelling device. The sensing unit senses at least one time and space varying magnetic field propagating in the air medium, at least transmitted via the navigational control station and in turn retransmits at least one signal processed by the sensing unit to at least one driving source that contributes to the movements of the device across a surface. The invention relates to an electronic navigational control system comprising means by which the signal generator sends a current through a navigational control station. The current generates a time and space variable magnetic field, whereby the sensing unit comprises means by which the robot is controlled based on the properties of the sensed magnetic field.

TECHNICAL BACKGROUND

The thought of developing fully automatic working tools is old. Such working tools may relate to devices for cutting grass, which from now on will be called a robot. Despite this fact, such products have only in recent years reached the market. One such example is the robotic lawn mower Auto Mower™. It mows a surface by moving across the surface within the area to be worked on. Loops are used to keep the robot within a delimited area. These comprise electrical conductors transmitting signals, which are sensed by a sensing device onboard the robot and thus controlling the movements of the robot from outside. The loops are used, for instance, to mark the boundary, which the robot must not exceed and to make the robot distance itself from the loop.

The sensing device normally consists of at least a receiving device for sensing for instance magnetic fields, a control unit connected to the receiving device to process the received signal and a motor control unit connected to the control unit to control the movements of the robot based on the processed information. When the robot approaches a loop, the system senses a change in magnetic field strength. The control unit processes the information and chooses to direct the robot in a certain direction dependent on which function that is activated.

A disadvantage with the previous loop system is that the robot follows a laid down loop in order to direct the robot towards a certain place, which can be represented by a charging station for the robot's batteries and/or parking place for when the robot is not working. To direct the robot towards this place, one must necessarily put down a navigational control station comprising a big closed loop so that the robot frequently intersects it during its normal movements and thereby has the possibility to start following the loop. A further disadvantage is that present types of navigational control stations normally direct the robot along a path, which is repeated each time the robot is directed. Thereby the robot's wheels will cause wear along the surface area they pass. The present invention has been developed with the intention to remedy these disadvantages.

SUMMARY OF THE INVENTION

In the present invention said sensed magnetic field, in an area mainly within the range of the navigational control station, at least at one point of time has different directions.

DESCRIPTION OF DRAWINGS

The invention is described more in detail in conjunction with the preferred embodiments and with reference to the enclosed drawings.

DESCRIPTION OF A PREFERRED EMBODIMENT

Examples of embodiments of a control system in accordance with the invention are shown in the figures. The examples of the embodiments shall not be interpreted as a limitation of the invention but their only purpose is to concretely shed light on preferred embodiments of the control system according to the invention. This is to further clarify the thought behind the invention.

The intention of the invention relates to developing a system using a navigational control station to direct a robot towards a specific target. The station area of the navigational control station, constituting the range of the station, shall be so small that the robot normally cannot move within this area and if the area is vertically positioned, the robot will never move inside the area. Besides, the magnetic field generated by the station shall be so strong that it can be sensed by the robot within a navigational control area extending inside and outside the station area. The generated magnetic field is used for the navigation of the robot within the navigational control area. The navigational control station can comprise a loop, a remote system, which, in certain cases, is sufficient to control the robot. The navigational control system can alternatively constitute or comprise two different loops, one proximity system, which increases the possibilities to influence the direction in which the robot is approaching its target. Another alternative is to use the two loops for creating both the proximity system and the remote system. A loop is defined as a closed loop of a conductor, wound in one or many loops, whereby the parallel sections of the conductor are not positioned so close to each other that the interfering magnetic fields do suppress each other completely.

The magnetic field generated by the remote system will propagate within an area defined by the navigational control range, whereby the robot senses the field direction and/or amplitude at the position of the robot. The robot can for example use this information to move closer to or further away from the station, to carry out circular movements around the station or to stop or possibly turn in relation to the station. The magnetic fields generated by the different loops in the proximity system will be opposed and superimpose. Consequently, they will propagate within an area defined by the navigational control range of the proximity loop, which, due to the co-operation between the two fields, will be significantly smaller than the navigation control range of the remote loop. By letting the proximity system co-operate with the remote system, the robot is, apart from the possibilities offered by the remote loop, enabled to approach the loop in a preferable way, e.g. so that the robot can be brought into such a position that a charging device at the navigational control station can charge the batteries of the robot.

Figure 1:
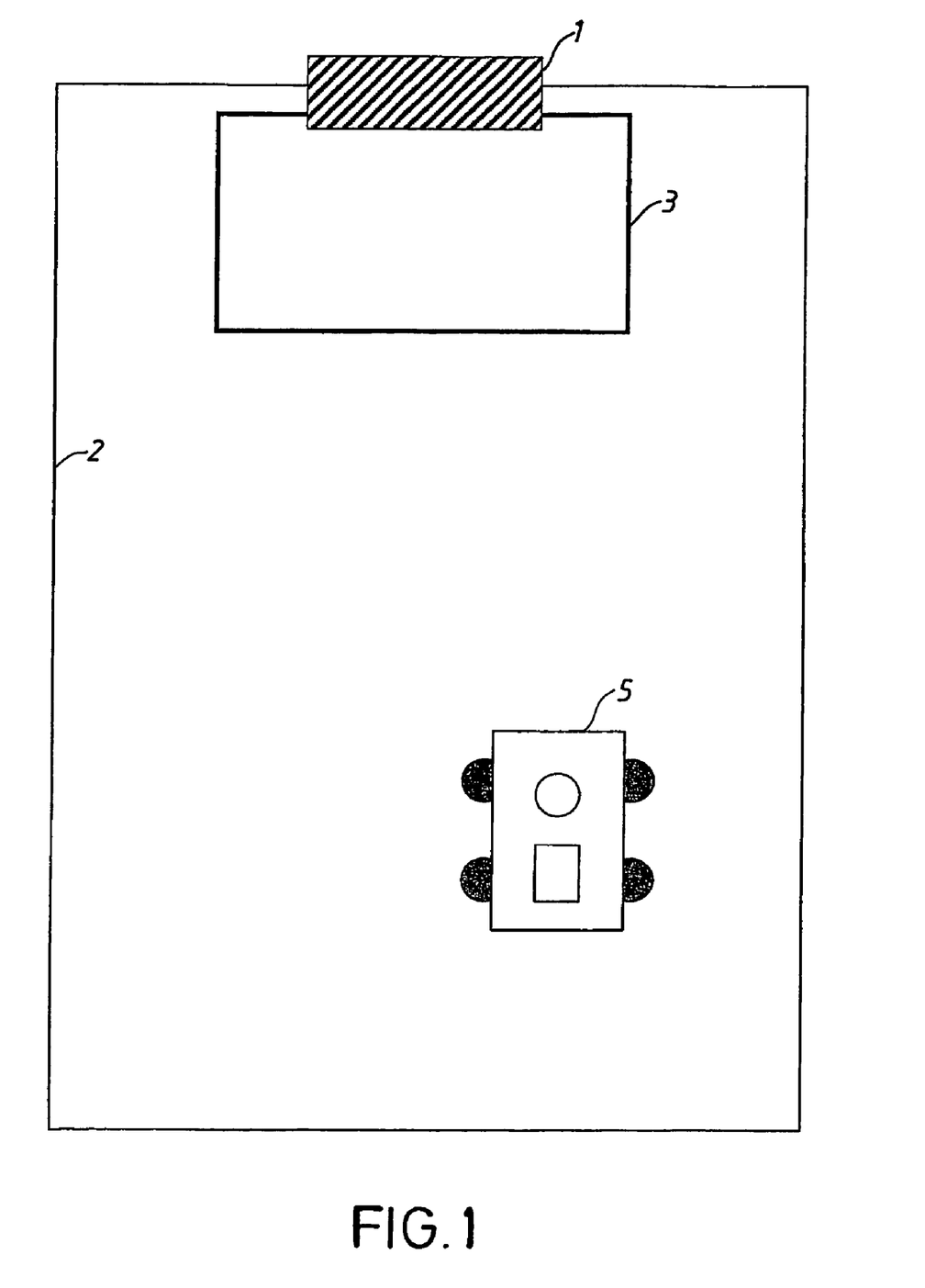
FIG. 1 shows a control system in accordance with the subject invention.

FIG. 1 shows a navigation control system in accordance with the invention. A signal generator 1 generates the current that is fed through the outer loop 2 and the navigational control station 3. The outer loop 2 is not necessary but shall be seen as an example of the type of loops used to encircle an area within which the robot is intended to move. The current fed through this loop generates a magnetic field that propagates out from the loop, by which the robot determines whether it is inside or outside the area defined by the outer loop. The area covered by the navigational control station 3 defines the station area. In the figure, the navigational control station 3 is represented by a block or a box.

The navigational control station 3 in the figure is horizontally positioned, but it might as well be positioned in any other way, e.g. vertically. One possibility is to position certain parts of the terminal, e.g. the remote system, in one direction and other parts, e.g. the proximity system, in a different direction. The intention of the navigational control station is mainly to generate a magnetic field that propagates within a navigational control area inside or outside of the terminal area, whereby the robot, within the navigational control area, can navigate in relation to the terminal When selecting the type of signal (frequency, amplitude) in the current fed through the outer loop 2 and the navigational control station 3, it is necessary to consider the properties of the electric conductor to be used. Since the conductor normally has inductive properties, the activation of a voltage pulse across a conductor will result in a delay of the rise of the corresponding current pulse up to the current level corresponding to the voltage across the conductor and the conductor's resistance, i.e. Ohm's law (I=U/R). Thus, during the initial stages of every current pulse, there will be a period of time during which the navigation control system does not work in accordance with stationary electric theory.

The navigation control station 3 comprises the significant part of the invention. The current fed through this part generates a time and space variable magnetic field used by the robot to navigate. The station is using one or many electric conductors wound as loops. The size/range of the navigational control area is influenced by the number of ampere-turns fed through the loops. With a current of 1 A in a loop of three turns, an equivalent range is generated as with 3 A in an equally sized one-turn loop. That means that the navigational control station that preferably uses a loop with several turns, differs from the outer loops that have been used and are used to define areas and enable the robot to follow a loop. These types of outer loops are using lower current and more important and are only drawn one turn around a bigger or smaller area. They are not intended to create a large navigational control area within which the robot can sense the magnetic field generated by the loop in order to navigate. The intention is to enable the robot, placed near to the loop, to determine on which side of the loop it is positioned and to enable it to follow the loop.

What should be known about this type of wiring of conductors as used in the navigational control station 3 is that conductors in close proximity with opposing current increase the inductance of the loop. The electric conductors can be made as etched conductors in a carrier or be wound as multiconductor cables, preferably mounted on a carrier. The advantage of a carrier is that the user does not need to make an effort installing the loop. If the carrier consists of mainly a plane disc, this can be installed in a suitable way. If the disc also is used in conjunction with a battery charger, a robot can, by driving up onto the disc, easier move itself in towards the charger's pole contacts (the charger is not shown in FIG. 1, but can preferably be read as the signal generator 1).

The opposed, parallel parts of the electric conductors, with opposed directions of current, may not be placed to close to each other (corresponds to a long and narrow terminal area). That would result in problems with the magnetic field, in turn significantly reducing the range of the magnetic field. A suitable choice of terminal surface area is 60×60 cm.

The current, which is generating the time-variable magnetic field in the navigation control station 3, can have different characteristics. A current of an alternating current character, such as a sinusoidal current, is a conceivable possibility. If a sinusoidal current of 0.2 A is used and resonance circuits are used for the robot's sensing, it is possible to achieve a navigational control area of the remote system with a radius of several metres. That implies that a loop of 10 turns would result in a value of 2 ampere-turns.

Figure 2:
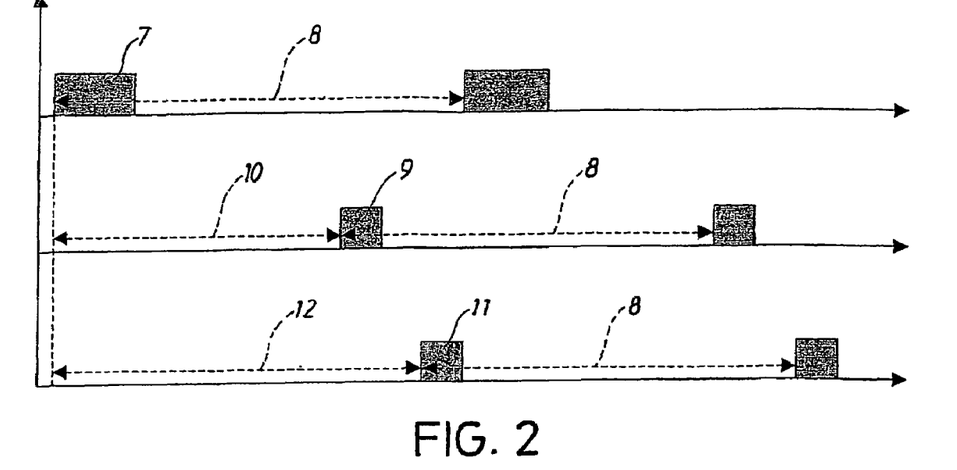
FIG. 2 shows a diagram presenting signals in the control system according to FIG. 1.

FIG. 2 shows another type of conceivable current signal that the navigation control station 3 could operate with. That signal is well suited for the type of navigation control system as intended in the invention. The figure does not take the conductors' inductance into account, so a more correct figure should really show how the current is delayed and rises versus time in accordance with the application. The pulse-generated magnetic field that propagates out from the control station 3 embodies the characteristics corresponding to the current. In FIG. 2, the pulse 7 corresponds to a main pulse A0 with a length of 100 μs. The choice of pulse length shall not be seen as a limitation of the invention but only represents suitable values in this embodiment example. The period time 8 for this, which is also the period time for the entire variant of current signals, is preferably 12 ms, which corresponds to the frequency of 83 Hz. The pulse N79 has a length of 50 μs, has the same period time 8 and occurs 7 ms 10 after A0. Note that 1 ms is the shortest possible distance to allow the control unit's 15 amplifier to be reset after the pulse A0. The resetting time depends on the fading out of the A0 signal in the amplifier's connecting capacitors. The pulse F9 11 has the same length and period time as N7 and occurs 9 ms 12 after A0.

Using current pulses of 2 A in a loop of 10 turns results in 20 ampere-turns, which under normal conditions means a navigational control area for the remote system corresponding to approximately 6 meters' radius. The disadvantage with current pulses is that the possibility to use resonance circuits does not exist. Instead, increased current is needed for a sufficient control range within the navigational control area, within which the sensing unit can detect a magnetic field from the navigational control unit. Sometimes push-pull is used to achieve an increased current out of the voltage of 40 V normally allowed in this type of installation. An increase of the number of ampere-hours is always desirable, but it also increases the magnetic field. Since the navigational control system will operate in environments close to human beings, it is important to keep the magnetic field low.

Using current pulses facilitates for the robot, which communicates with the loop 2 and the navigational control station 3 through the magnetic fields, to avoid problems of being superimposed with other magnetic fields. Since the current pulses occur at different points of time, during short time intervals and by allowing the robot to listen for pulses during the corresponding time intervals only, the system can filter away other magnetic field noise that could interfere with the robot's function. The control unit can also be allowed to listen for A0 pulses 7 and synchronise itself with them. If A0 is not being used, the robot can be synchronised with some other pulse.

Figure 3:
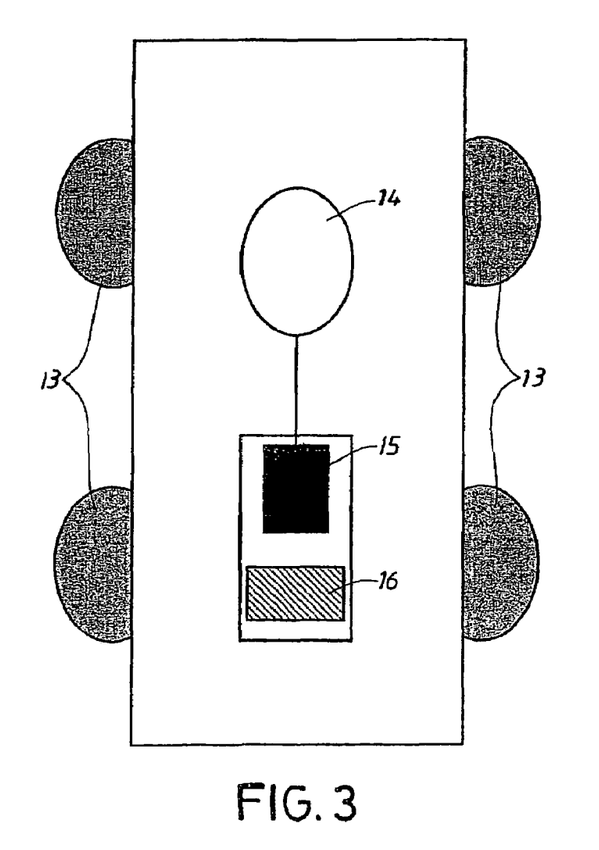
FIG. 3 shows a self-propelling device for the navigational control system according to FIG. 1.

The robot is shown in FIG. 3. It comprises a detection device 14, 15, 16 as part of the navigational control system. Furthermore, the robot has wheels 13, which is not intended to limit the thought of invention. Caterpillar tracks are an alternative possibility. The detection device normally constitute a unit in common, comprising functions for reception 14 (henceforth called receiver) of magnetic fields, control 15 (henceforth called control unit), processing of the received magnetic field and motor control 16 for controlling the drive motors and adjustable wheels on the robot. The functions are shown as separate units in the figure, with the intent to clarify that the detection unit has these functions.

In real life, most of the time the separation is carried out by means of software in a computer unit, where the software is complemented with additional components for the computer unit. The receiving unit normally comprises one or several coils, which enclose a ferrite rod placed in the centre of the respective coil. The coil and the ferrite rod is normally placed horizontally, but if, for instance, the navigational control station were vertically oriented, the coil and the rod would possibly have to be rotated to facilitate reception of the magnetic field. If many coils are used, they can be placed in different directions. The magnetic field having a field direction mainly parallel to the coil influences the receiving unit by means of the coil detecting the change in field strength. The control unit receives the signals from the receiving unit and processes the information. Subsequently it communicates signals to the motor control unit 16, which control the motors (not shown) driving the wheels 10.

A control unit for this type of device has naturally many tasks, for instance controlling the tools, cutting, cutting device, brushes etc possibly mounted on the robot. To facilitate this, such a control unit normally has memory units for storage of software code executed during operation. Of main interest for the present invention is its processing of magnetic fields transmitted by a loop and received by the receiving unit 14. Consequently the robot's parts are only schematically shown. The processing is described in further detail below in conjunction with the presentation of the robot's function.

The task of the navigational control station 3 is to create several navigational control areas for the control of the robot in relation to the navigational control station. By different control areas is meant that the magnetic fields from the proximity system and the remote system respectively do not create equally sized navigational control areas. The magnetic field transmitted by the navigational control unit can e generated by a current of suitable characteristics, such as a sinusoidal current or current pulses. The intention of invention is not limited to the character of the current. The essential thing is that the magnetic fields generated around the station are possible to discriminate and to be interpreted by the sensing unit (14, 15, 16). The vertical magnetic field's direction is described below. Thereby is understood the direction of the magnetic field in a certain position at a certain point of time. For pulse systems, the direction is always as shown in the figures, but for a sinusoidal or similar system the magnetic field is changing direction all the time.

Figure 5:
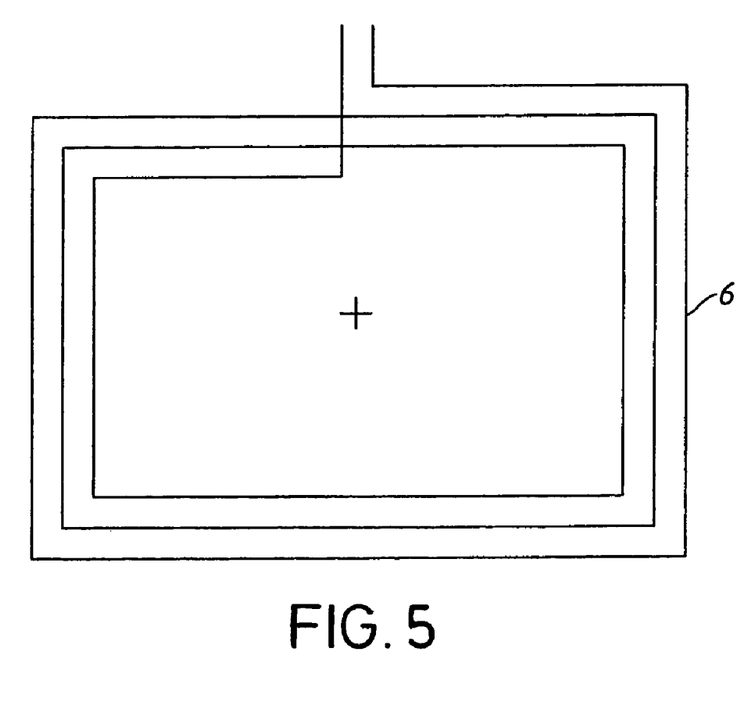
FIG. 5 shows an alternative embodiment of the navigational control station according to FIG. 1.

FIG. 5 shows a possible embodiment of the navigational control station 3. The loop 6 is illustratively wound 3 turns in the figure, but it is possible to use more or fewer turns. The area covered by the loop corresponds to the area of the station. The station area need necessarily not have a horizontal extension. The embodiment is suited for use with the remote system, which is intended to contribute to the navigation of the robot when it moves far away from the navigational control station 3. If the loop were to be illustrated in a vertical position, the magnetic field would still propagate from the station, but the field would be rotated 90 degrees.

Figure 6:
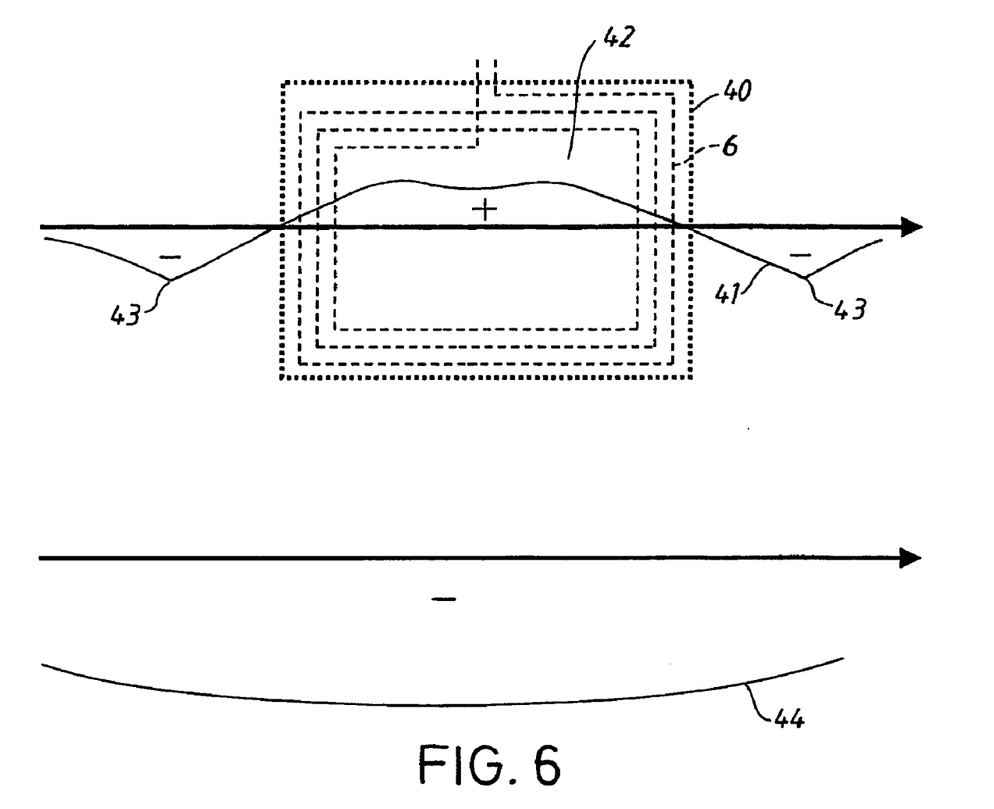
FIG. 6 shows a top view of the vertical magnetic field, as sensed by the sensing unit, around the navigational control station according to FIGS. 4 and 5.

FIG. 6 shows the magnetic field, as detected by the receiving unit 14, at one point of time. Since the loop of the example preferred embodiment is horizontally positioned, the vertical coil detects the vertical magnetic field. The coil is positioned 10 cm above the ground. The strength and direction of this field constitute the information used by the robot to navigate. The loop 6 is shown in the upper part of the figure. The frame 40 illustrates where in relation to the loop the vertical field 41 is changing direction. The reason for the change of direction occurring outside the loop is that the parallel parts of the loop with opposite current influence each other to the extent that the magnetic field's change of direction is forced outwards. The phenomenon becomes stronger the closer to each other the parts of the loop are positioned.

The graph for the vertical field 41 has its peak value 42 within the loop 6 and its lowest values 43 a somewhere outside the loop. The two peaks indicate that the field strength decreases with the distance to the conductor, even within the loop 6. The field strength decreases rapidly outside the loop. Further down in FIG. 6 it is shown how the vertical field 44 sensed by the robot decreases. The graph is rather flat, but if the scale of the loop 6 would be decreased, the graph would instead fall rather rapidly within the diagram. The magnetic field decreases rapidly with the radial distance to the loop, which applies to all magnetic fields in the navigational control system. Note that the vertical field 44 at the same point of time has a negative direction in relation to that of the field 41 within the loop.

Figure 7:
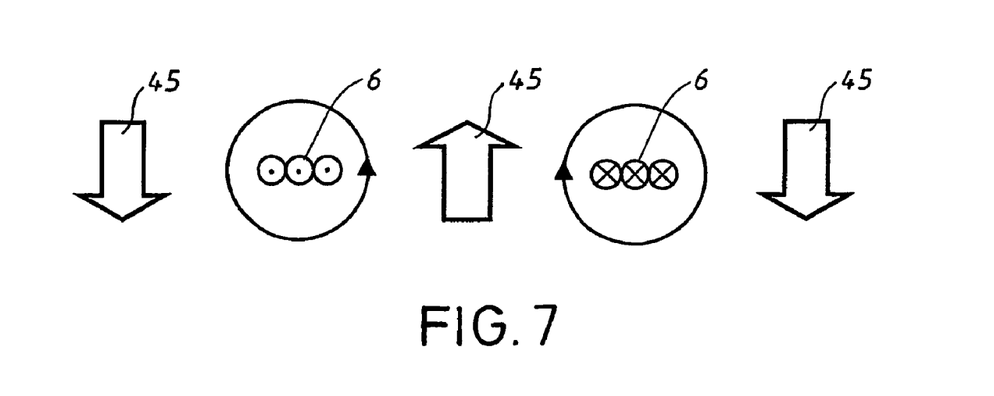
FIG. 7 shows a side view of the field direction of the vertical magnetic field, as sensed by the sensing unit, for the navigational control station according to FIG. 5.

FIG. 7 presents a view where the conductors' cross-section and the magnetic field's significant direction 45 within the loop 6 is shown. The field direction 45 corresponds to that the signal generator 1 has sent a current moving counter clockwise in FIG. 5-6. The crosses in FIG. 7 corresponds to that the current moves inwards in the figure and the dots to that it moves outwards. Note that the vertical magnetic field that is detected by the robot's sensing unit 14, 15, 16 outside the navigational control area (approximately 6 meters at 20 ampere-hours) of the remote system will be so weak, that it can not be detected by the sensing unit.

Figure 4:
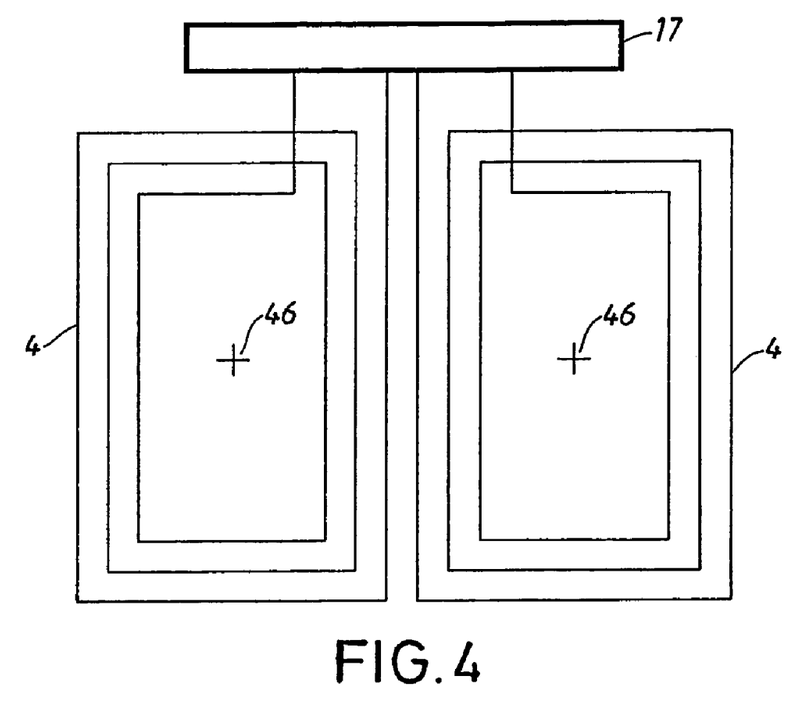
FIG. 4 shows an embodiment of the control station according to FIG. 1.

FIG. 4 shows another possible embodiment of the navigational control station 3. The station comprises a right and a left loop 4. Each loop is for the sake of illustration wound 3 turns, but it is possible to use more or fewer turns. The area covered by the loops corresponds to the station area. The station area need not necessarily have a horizontal extension range or extend in the same direction as the loop 6 if these are combined. The embodiment is suited for use both as the remote system, which is intended to direct the robot when it moves far away from the navigational control station 3 and as the proximity system, which is intended to direct the robot when it moves close to the navigational control station. In FIG. 4 the loops 4 are connected to the connecting box 17 so that both, at the same point of time, show the same magnetic field direction 46 within the area enclosed by the respective loop 4. The connection can be made by hardware and/or software by the signal generator 1. This results in a vertical magnetic field pattern corresponding to that shown in FIG. 6. If the loops were to be illustrated in a vertical position, the magnetic field would still propagate away from the station, but the field would be rotated 90 degrees. The embodiment of the station according FIG. 4 is suitable as a remote system.

Figure 8:
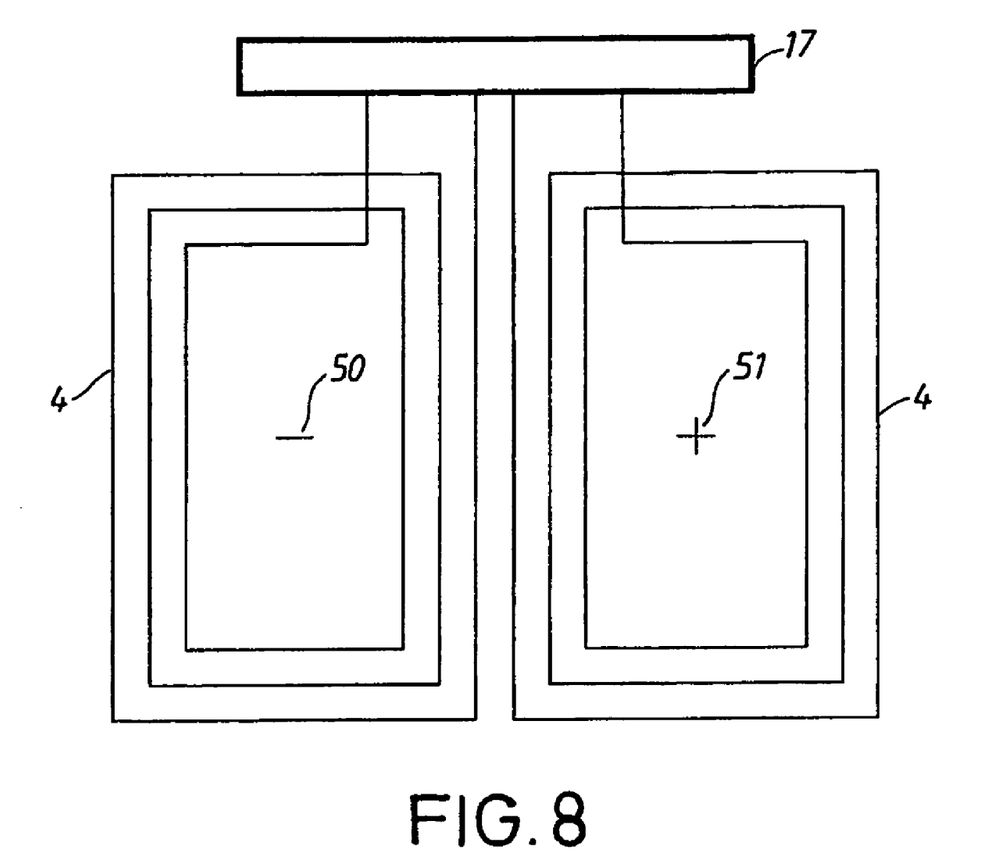
FIG. 8 shows an alternative embodiment of the control station according to FIG. 4.
Figure 9:
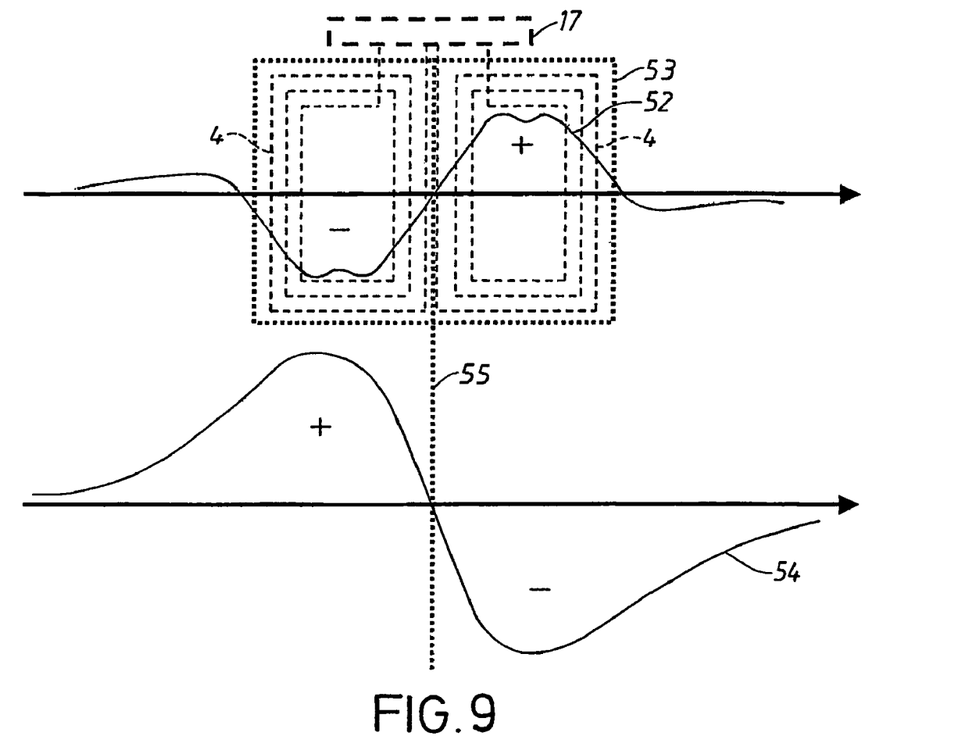
FIG. 9 shows a top view of the vertical magnetic field, as sensed by the sensing unit, around the navigational control station according to FIG. 8.

In FIG. 8 the loops 4 are connected to the connecting box 17 so that they at the same point of time show magnetic fields with directions 50, 51 opposed to each other within the area enclosed by the respective loop 4. This results in a vertical magnetic field 52, sensed by the receiving unit 14, as shown in FIG. 9. The coil is placed 10 cm above the ground. Even in this case the change of direction 53 is forced outwards. The peaks of graph 52 illustrate the fact that the field strength decreases with the distance to from the conductors, also within the loops. The shape of the peak depends on where the coil is positioned in relation to the loop. Outside the loop the magnetic field 52 decreases faster than in the case with a loop 6, because the fields from the two loops interfere with each other. At 20 ampere-turns (2 A and 10 turns), the range of the navigational control area is approximately 1 meter away from the station. In the lower part of FIG. 9, the sensed magnetic field 54 is shown a certain distance from the loop. A line 55 illustrates where the co-operation of the two magnetic fields 50, 51 results in a zero amplitude field. A change of field direction takes place along this line, i.e. the sensing unit detects a change of field direction if the robot crosses this line. Further out the line will propagate as a funnel due to a decreasing field. Within the funnel, the sensing unit does not essentially detect any field. The propagation of the funnel varies with time depending on interference generated within and outside the navigational control system and on that the fields from the two loops co-operate with each other.

Figure 10:
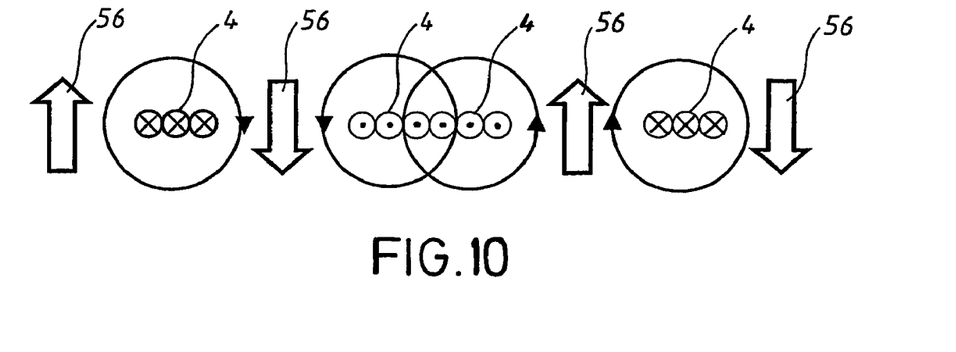
FIG. 10 shows a side view of the field direction of the vertical magnetic field, as sensed by the sensing unit, for the navigational control station according to FIG. 8.

The essential field direction 56 of the magnetic fields around the 4 conductors is shown in FIG. 10. The field direction 56 corresponds to the generator having sent a current moving counter-clockwise in the right loop and clockwise in the left loop. The crosses corresponds to that the current moves inwards in the figure and the dots to that it moves outwards.

The connection box 17 is mentioned in the latest described embodiment of the navigational control station with two loops 4. By using current pulses and letting the signal generator control the connections based on these pulses, a useful time separation of magnetic fields can be achieved. If there is an outer loop, the synchronisation pulse A0 7 can be allowed to go through the outer loop 2. Alternatively, A0 can be sent through some other existing loop. The pulse N7 9 can for instance go through the loops 4 connected according to FIG. 8 and the pulse F9 11 go through the loops 4 connected according to FIG. 5. Thereby one embodiment of loops in the navigational control station 3 may suffice. Control implies a continuous change in the connection of the loops based on which pulse is approaching. This results in that a combined remote and proximity system is achieved. The receiving unit 14 will register up to 3 magnetic fields, which are generated at different points of time, see FIG. 2, and controls its movements based on one of them.

Alternatively, a type 6 loop can be used for the remote system and the two loops 4 for the proximity system, where the loops propagate in the same or different directions. Sometimes it is desirable to cause a change of directions for the magnetic fields that coincide in the space for the proximity system and the remote system. In such cases a separate remote loop enclosing the proximity loops are preferred. Since the change of direction of the proximity loops 4 is forced further out than that of the remote loop 6, changes of direction coinciding in the space are achieved by this arrangement.

When choosing type of current in the system, it is important to consider whether a reference is needed. The intention with the navigational control of the robot as described below is that the sensing unit when necessary has the possibility to decide in relation to what the field's direction shall be determined. If the system comprises one remote system only, one sinusoidal signal only for generating the magnetic field 42 may very well suffice. The robot will, inside the navigational control area of the remote system, navigate according to the field strength only, whereby the sensing unit, when coming inside the loop, takes into account that the field is changing directions. However, for manoeuvring within the navigational control area generated by the proximity system, at least two signals with different frequencies (multiple in relation to each other) are required to enable the sensing unit to make a comparison. Otherwise the robot will not know what is right and left in the proximity system.

Due to the two signals generating magnetic fields that change directions at a certain ratio depending on the signal's frequency relation to each other, the direction of the respective magnetic fields at a certain point of time is compared. The same two signals are transmitted through both loops 4. If the navigational control system comprises remote as well as a proximity system, a signal can be transmitted through the proximity system and the remote system. There is a need for at least two signals in the navigational control system. If current pulses are used, the comparison problem does not arise because the sensing unit knows the magnetic field direction due to the current pulses being transmitted in one direction only. A third sensing alternative is to transmit fields with different directions. Such a method requires coils so positioned that they can detect the different fields.

The function of the navigational control system shall now be described with reference to FIGS. 11-12. The main objective with the communication between the robot and the navigational control station 3 is mainly to enable the robot to control its movements in relation to the station without having to follow the loop. The signal generator 1 generates current in the navigational control station 3 which in turn generates magnetic fields, which create the navigational control areas within which the robot can be controlled. The magnetic field is picked up by the receiving unit 14 on the robot and the control unit 15 filters out remaining magnetic field noise from the picked up magnetic fields.

Irrespective of the type of current, the control unit 15, containing a number of algorithms to handle the received magnetic field, will use the information contained in the magnetic field for different purposes. When an algorithm for sensing the magnetic field from the navigational control station 3 is activated (for instance by the battery charging level starting to become low), it makes sure that the robot 5, when moving detects that the field strength changes, depending on algorithm chooses to move towards a higher field strength, follow a field line for constant field strength, move towards lower field strength or stop and possibly turn. The detection is naturally not based on the variations of the current within each signal period but on the magnetic field strength or the ration between two magnetic fields. The robot is consequently manoeuvring itself based on the detection of the field's properties.

Figure 11:
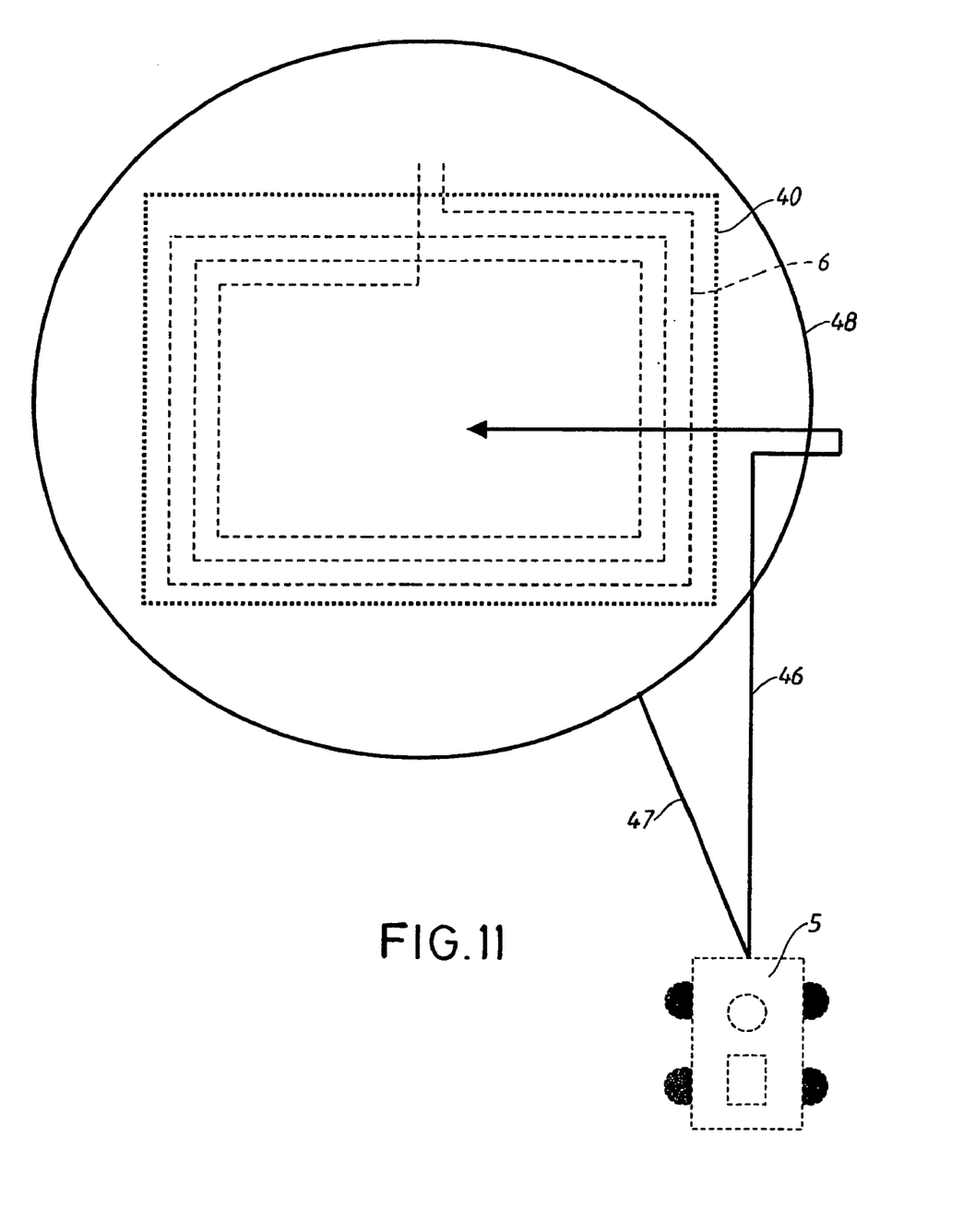
FIG. 11 shows two patterns of movement possible for the robot while sensing the magnetic field generated by the navigational control station according to FIGS. 4 and 5.

In the remote system case, two of the robot's five possible paths of movement are shown in FIG. 11. When the algorithm for detection of the magnetic field 43 and 44 is activated, it is, to achieve a movement path 46, ensured that the robot, when moving and detecting an increasing field strength, continues straight forward. If the field strength is interpreted as unchanged when the robot is moving, it turns 90 degrees in any direction. If the field strength is interpreted as decreasing when the robot is moving, the robot turns 180 degrees. The movement opens the possibility to use the remote system only to direct the robot. This would result in that the robot finds its way in towards the middle of the navigational control station 3 from any undefined direction. In the case of an alternative movement path 47, the robot seeks an isobar 48 corresponding to a specific magnetic strength and then follows it. When the receiving unit 14 comes inside the loop and the field changes direction, the algorithm takes this into account. When using the remote loop, the robot is not dependent of knowing the field direction.

Figure 12:
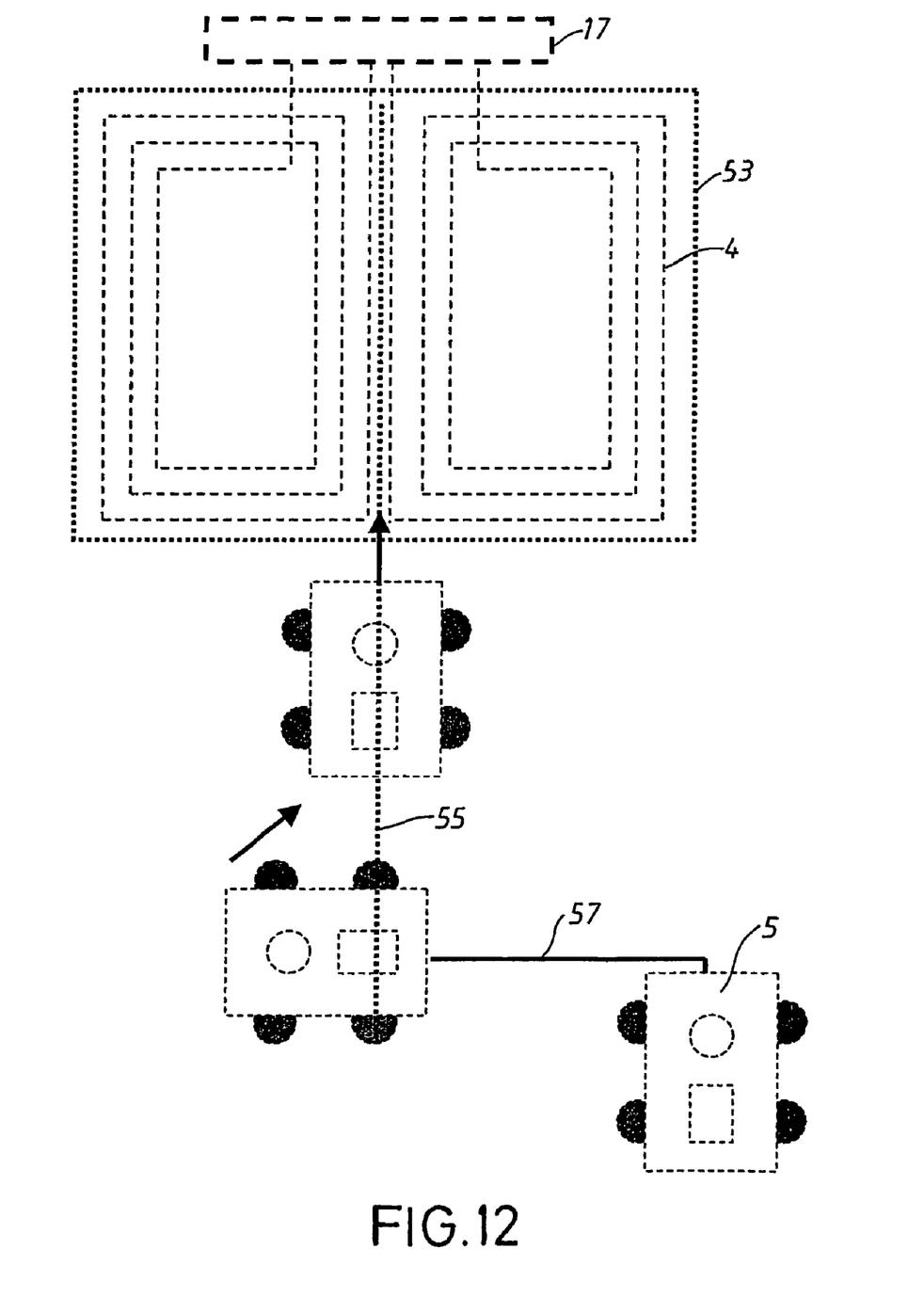
FIG. 12 shows one pattern of movement possible for the robot while sensing the magnetic field generated by the navigational control station according to FIG. 8.

In the case with the proximity system, FIG. 12 shows a possible movement path for a different algorithm. The generated field in the proximity system propagates approximately one meter out from the loops 4. When the algorithm for sensing the magnetic fields 52 and 54 is activated, it makes sure that the robot, when in movement and intersecting the line 55, which corresponds to a change of field direction, with the wheels as a counting reference continues running until the rear axle is essentially positioned above the line. It subsequently turns until the receiving unit once again senses a change of direction. The robot then follows the line in towards the loops. The algorithm knows in which direction the robot shall turn by sensing the relationship between the magnetic fields transmitted by the respective loop.

When the robot's sensing unit comes essentially inside the propagation area of the navigational control station, the magnetic field changes directions. Where the change of direction takes place has been described in the text. Simultaneously, the field strength will again start to decrease. In what way the field strength will change depends on whether a proximity system or remote system with one or two loops are used. When the field is changing, the robot is positioned very close to the station and will find out by means of the field change. This constitutes a smaller problem for the proximity system, since the robot, by following the line 55, already has a satisfactory way of manoeuvring. To primarily watch out for is that the change in field direction between the loops 4 is very strong.

On the other hand, the field strength in the remote system will again start to decrease within the station area. One possibility is that the sensing unit reverts its calculations and instead finds its way towards lower field strength as long as it once again does not detect a change in field direction. Such a change would of course indicate that the sensing unit once again were in the vicinity of the station.

Using the loop 6 only for navigation means that fine-tuning against the contact poles is not achieved but instead the charging station must be designed as a cap with possible contact from all directions. With such a cap, the navigational control station can have the embodiment as shown in FIG. 5 or propagate in a circular manner. The robot will in that case only steer towards higher field strength and, independent of from which direction it comes, find the poles of the cap. By combining the proximity and remote system and use movement path 47 and 57, the robot can first follow an isobar 48 for the remote system until it intersects the line 55, then finding its way in along the line. Alternatively the robot can follow an isobar for the proximity system. The isobar for the proximity system to a certain extent runs parallel to the line 55, so in principle this movement would lead the robot all the way in. However, because the robot is big and slow, following the isobar in such a way is often not enough. The robot instead uses the line 55.

As regards the robot, possible fields of applications for this type of navigational control system are operating robots such as grass-cutting robots and vacuum cleaning robots. These comprise operating tools such as knives or brushes. It would for instance be conceivable that the control unit controls their operation based on the information transmitted by the loops. For instance, the knives are broken off as a result of certain movements. Other robots could be cleaning robots for wet-cleaning of large floor areas, for example in industrial buildings. The choice of field of use is not essential, but instead the application relates to the search system.

The intention of the presented embodiments is to concretise the invention and shall not be interpreted as a limitation of the invention. Embedded in the thought of invention is also the possibility to equip the system with more or fewer loops and signal generators, for instance in order to set boundaries around surfaces, across which the robot is intended to move, control the robot along a loop and possibly use more than one robot. Further embodiments are therefore contained within the thought of invention as specified in patent claim 1. The invention is consequently not limited to what is described above or to the embodiment shown in the drawings, but the arrangement can be used within all areas where search systems for autonomous devices on wheels, normally designated robots, come into use.

The invention claimed is:

1. Method for maneuvering a self-propelling device (5) towards a navigational control station (3) by means of an electronic navigational control system comprising at least said navigational control station (3) with at least one loop (4) connected to at least one signal generator (1) and one sensing unit (14,15,16) arranged at the self-propelling device (5), whereby the sensing unit (14,15,16) at least senses an, in the air-medium propagating, time and space varying magnetic field, transmitted by the at least one loop (4) and in turn retransmits at least one, by the sensing unit (14,15,16) processed signal to at least one drive source that contributes to the device's (5) movements across a surface, the signal generator (1) sends a current through the at least one loop (4), the current generating the time and space varying magnetic field (43,44,52,54), whereby the sensing unit (14,15,16) maneuvers the device (5) based on the properties of the sensed magnetic field (43,44,52,54), characterised in that said sensed magnetic field (43,44,52, 54), in an area enclosed by said loop (4), at least at one point of time has different directions (50,51).

2. Method according to claim 1 characterised in that the device (5), when moving mainly outside the range of the navigational control station and sensing a change in the magnetic field (44,54), maneuvers itself in relation to the navigational control station (3) so that it by means of one or many maneuvers will approach, essentially stay at a constant distance from or distance itself from the navigational control station (3), alternatively stop and/or turn.

3. Method according to claim 2 characterised in that the device (5), when moving in a course direction and senses an unchanged magnetic field strength (44,54), changes directions 90degrees, that the device, when moving in a course direction and senses an increased magnetic field strength (44,54), continues in the same course direction and that the device, when moving in a course direction and senses a decreased magnetic field strength (44,54), changes course directions 180degrees.

4. Method according to claim 2 characterised in that the device (5) moves in a course direction that corresponds to that the sensed magnetic field (44, 54) is constant.

5. Method according to claim 2 characterised in that the device (5), when sensing that the magnetic field (44,54) changes directions (55), continues to move a certain distance in the same direction, then stops and turns until it again detects that the magnetic field (44,54) changes directions (55), whereupon it moves essentially in the same direction as a line (55), which ties together points where the sensed magnetic field (44,54) changes directions.

6. Method according to claim 1 characterised in that the sensing unit (14,15,16), when sensing the magnetic field (43, 52) within the range of the navigational control station (3), adapts its processing of the sensed magnetic field (43,52).

7. Method according to claim 1 characterised in that at least one signal generator (1) sends a first current trough the navigational control station (3), whereby the magnetic field (43, 44), generated by the current at a point of time mainly inside the range of the navigational control station (3), has a direction essentially opposed to the direction of the magnetic field (43,44) at the same point of time mainly outside of the mentioned range.

8. Method according to claim 1 characterised in that at least one signal generator (1) sends a second current through the navigational control station (3) and the mentioned (1) or another signal generator (1) sends a third current through the navigational control station (3), whereby the magnetic field (43,44), generated by the second current in a second area mainly within the range of the navigational control station (3), at a point of time has a direction essentially corresponding to the direction (46) of the magnetic field (43,44) generated by the third current at the same point of time in a third area mainly within the range of the navigational control station (3).

9. Method according to claim 8 characterised in that the second current corresponds to the third current.

10. Method according to claim 1 characterised in that at least one signal generator (1) sends a second current trough the navigational control station (3) and the mentioned (1) or another signal generator (1) sends a third current through the navigational control station (3), whereby the magnetic field (52,54), generated by the second current in a second area mainly within the range of the navigational control station (3), at a point of time has a direction essentially opposite to the direction (50,51) of the magnetic field (52,54) generated by the third current at the same point of time in a third area mainly within the range of the navigational control station (3).

11. Method according to claim 8 characterised in that the direction (46,50,51) of the magnetic fields (43,44,52,54) generated in the second and third areas depend on the properties of the sent currents.

12. Method according to claim 8 characterised in that the magnetic field's (43,44,52,54) direction (46,50,51) within the second and the third areas respectively at a point of time depends on the properties and the occurrence of current pulses (7,9,11).

13. Method according to claim 8 characterised in that when a first current pulse N7 (9) occurs, the magnetic field (54) in the second area, at a point of time, shows a direction (50) essentially opposed to the direction (51) of the magnetic field at the same point of time in the third area and when another current pulse F9 (11) occurs, the magnetic field (54) in the second area, at a point of time, shows a direction (46) essentially corresponding to the direction (46) of the magnetic field in the third area.

14. Method according to claim 10 characterised in that outside and within the range of the navigational control station an undefined area (55) is created that essentially defines two areas, which at a point of time have magnetic fields essentially opposed to each other.

15. Method according to claim 14, wherein the second current corresponds to the third current.

16. Method according to claim 14, wherein the direction of the magnetic fields generated in the second and third areas depend on the properties of the sent currents.

17. Method according to claim 1 characterised in that at least one current in the system constitutes a sinus component.

18. Method according to claim 1 characterised in that at least one current sent in the system most of the time is in a state of rest when it is mainly constant, whereby periodically the state of rest is interrupted by at least one characteristic reference current pulse (7,9,11).

19. Method according to claim 18 characterised in that the sensing unit (14,15,16), knowing the properties of the reference pulse (7), adapts the time intervals within which the sensing unit (14,15,16) sense magnetic fields.

20. Method according to claim 19 characterised in that adaptation means that the sensing unit (14,15,16) synchronises the unit's (14,15,16) working frequency in the time domain based on the reference current pulse (7).

21. Method according to claim 19 characterised in that adaptation means that the sensing unit (14,15,16) synchronises the properties of the time intervals in the time domain based on the properties of the reference current pulse (7,9,11).

22. Method according to claim 18 characterised in that each signal generator (1) in the navigational control system synchronises its sent current pulses (7,9,11) with the other current pulses (7,9,11) in the system so that no current pulses (7,9,11) coincide at the same time during the same signal period (8).

23. Electronic navigational control system for a self-propelling device (5), the system comprising at least one navigational control station (3) with at least one loop (4) connected to at least one signal generator (1) and a sensing unit (14,15,16) arranged at the self-propelling device (5), whereby the sensing unit (14,15,16) senses at least one time and space varying and in the air medium propagating magnetic field, at least transmitted via the at least one loop (4), in turn re-transmitting at least one, by the sensing unit (14,15,16) processed, signal to at least one driving source that contributes to the device's movements across an area, the system comprises means by which the signal generator (1) sends a current through the at least one loop (4), the current generating the time and space varying magnetic field (43,44,52,54), whereby the sensing unit (14,15,16) comprises means by which the device (5) is maneuvered based on the properties of the sensed magnetic field (43,44,52,54), characterised in that that said sensed magnetic field (43,44,52,54), in an area enclosed by said loop (4), at least at one point of time has different directions (50,51).

24. Electronic navigational control system according to claim 23 characterised in that at least one current being sent in the system during the main part of the time is in a state of rest, where it is essentially constant, whereby the state of rest is periodically interrupted by at least one characteristic reference current pulse (7,9,11).

25. Electronic navigational control system according to claim 23 characterised in that the navigational control station (3) comprises a first loop (6) which surrounds a first area, said loop extends in one plane.

26. Electronic navigational control system according to claim 25 characterised in that the navigational control station (3) comprises a second and a third loop (4), whereby the second loop (4) surrounds a second area and the third loop (4) surrounds a third area.

27. Electronic navigational control system according to claim 26 characterised in that the respective loop (4,6) extends in one plane.

28. Electronic navigational control system according to claim 25 characterised in that the plane extends parallel to the ground surface or vertical to the ground surface.

29. Electronic navigational control system according to claim 25 characterised in that at least one loop constitutes an electric conductor that is placed above, in or below the continuous surface across which the device is intended to move.

30. Electronic navigational control system according to claim 25 characterised in that at least one loop constitutes a continuous electric conductor that is wound in more than one turn.

31. Electronic navigational control system according to claim 30 characterised in that the electric conductor constitutes a fix guide path placed on a carrier.

32. Electronic navigational control system according to claim 23 characterised in that by a self-propelling device (5) is meant an operating robot comprising a operating system for working on the surface across which the robot is moving.

33. Electronic navigational control system according to claim 32 characterised in that the operating system is controlled based on information received and/or stored for processing by the sensing unit (14,15,16).

34. Electronic navigational control system according to claim 32 characterised in that the robot constitutes a lawnmowing robot, whereby the operating system constitutes knives which, when moving, cut off the biological material growing on the surface.

35. Electronic navigational control system according to claim 32 characterised in that the robot constitutes a vacuum cleaning robot, whereby the operating system comprises the parts with which a vacuum cleaning robot is normally equipped for cleaning the surface from dirt, for instance a rotating brush and a suction device.

36. Electronic navigational control system according to claim 32 characterised in that the robot constitutes a cleaning robot, whereby the operating system comprises the parts with which a cleaning robot is normally equipped for cleaning the surface from dirt, for instance tools for wet-cleaning.

\* \* \* \* \*

UNITED STATES PATENT AND TRADEMARK OFFICE
CERTIFICATE OF CORRECTION

PATENT NO. : 7,574,282 B2
APPLICATION NO. : 10/516793
DATED : August 11, 2009
INVENTOR(S) : Petersson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1065 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,574,282 B2 |
| APPLICATION NO. | : 10/516793 |
| DATED | : August 11, 2009 |
| INVENTOR(S) | : Ulf Petersson et al. |

It is certified that error appears in the above-identified patent and that said Letters Patent is hereby corrected as shown below:

Column 11, line 9, please delete "180degrees" and insert --180 degrees--;
Column 12, line 15, please delete "claim 14" and insert --claim 10--;
Column 12, line 17, please delete "claim 14" and insert --claim 10--.

Signed and Sealed this
Fifteenth Day of February, 2011

David J. Kappos
*Director of the United States Patent and Trademark Office*